United States Patent
Lai (10) Patent No.: US 8,064,830 B2
(45) Date of Patent: Nov. 22, 2011

(54) WIRELESS ACCESS SYSTEM CAPABLE OF CONTROLLING ELECTRONIC DEVICES AND CONTROL METHOD THEREOF

(75) Inventor: Yen-Hung Lai, Taipei (TW)

(73) Assignee: Compal Communications, Inc., Neihu, Taipei (TW)

( * ) Notice: Subject to any disclaimer, the term of this patent is extended or adjusted under 35 U.S.C. 154(b) by 340 days.

(21) Appl. No.: 12/426,939

(22) Filed: Apr. 20, 2009

(65) Prior Publication Data

US 2009/0270046 A1    Oct. 29, 2009

(30) Foreign Application Priority Data

Apr. 23, 2008    (TW) ................................ 97114803 A (51) Int. Cl.
*H04B 7/00* (2006.01)
(52) U.S. Cl. .......... 455/41.2; 455/73; 345/173; 715/740
(58) Field of Classification Search .................. 345/173; 455/41.2, 73; 715/700, 740
See application file for complete search history.

(56) References Cited

U.S. PATENT DOCUMENTS

| 6,052,120 | A  | * | 4/2000  | Nahi et al. ...................... 715/700 |
| 6,084,584 | A  | * | 7/2000  | Nahi et al. ...................... 715/864 |
| 6,590,588 | B2 | * | 7/2003  | Lincke et al. .................. 715/744 |
| 6,760,595 | B2 | * | 7/2004  | Inselberg ........................ 455/517 |
| 7,574,691 | B2 | * | 8/2009  | Freitas et al. .................. 717/113 |
| 2004/0002902 | A1 | * | 1/2004 | Muehlhaeuser ................ 705/26 |
| 2004/0140986 | A1 | * | 7/2004 | Boldon ......................... 345/700 |
| 2004/0181292 | A1 | * | 9/2004 | Ha et al. ......................... 700/17 |
| 2005/0272503 | A1 | * | 12/2005 | Thoresson ...................... 463/40 |
| 2007/0229465 | A1 | * | 10/2007 | Sakai et al. .................... 345/173 |
| 2009/0137269 | A1 | * | 5/2009 | Chung ........................ 455/556.1 |
| 2011/0037714 | A1 | * | 2/2011 | Seo et al. ....................... 345/173 |
| 2011/0105103 | A1 | * | 5/2011 | Ullrich ........................... 455/420 |

* cited by examiner

*Primary Examiner* — Lincoln Donovan
*Assistant Examiner* — William Hernandez
(74) *Attorney, Agent, or Firm* — Winston Hsu; Scott Margo (57) ABSTRACT

A wireless access system includes an electronic device and a portable wireless access device. The electronic device includes a user interface and a first wireless transceiver. The portable wireless access device is wirelessly connected to the electronic device through a wireless broadband interface. The portable wireless access device includes a touch panel, a second wireless transceiver, and a controller. The second wireless transceiver receives an image datum corresponding to the user interface transmitted from the first wireless transceiver and transmits a location datum corresponding to a function item of the user interface to the first wireless transceiver. The controller controls the touch panel to display the user interface according to the image datum and generates the location datum after selecting the function item on the touch panel. After the first wireless transceiver receives the location datum, the electronic device executes a function according to the location datum.

6 Claims, 7 Drawing Sheets

| Frame type | Device name | Height | Width | RBG |
|---|---|---|---|---|
| 0x01(1B) | 50 Bytes | 2 Bytes | 2 Bytes | 3 Bytes |

FIG. 4

| Frame type | Sequence |
|---|---|
| 0x02 (1B) | 2 Bytes |

FIG. 5

| Frame type | Final datum |
|---|---|
| 0x03 (1B) | 0xffff (2B) |

FIG. 6

| Frame type | Height | Width | Event |
|---|---|---|---|
| 0x04(1B) | 2 Bytes | 2 Bytes | 1 Byte |

FIG. 7

WIRELESS ACCESS SYSTEM CAPABLE OF CONTROLLING ELECTRONIC DEVICES AND CONTROL METHOD THEREOF

BACKGROUND OF THE INVENTION

1. Field of the Invention

The present invention relates to a wireless access system and a control method thereof, and more particularly, to a wireless access system capable of controlling electronic devices and a control method thereof.

2. Description of the Prior Art

With the development of new technology, electronic devices used widely in daily life, such as TV, a video recorder, and/or so on, have gained more and more functions. That is to say, control interfaces for controlling the electronic devices also have gained more and more complicated operations. A remote controller is the most representative example. Generally, the remote controller capable of controlling domestic electronic devices is connected to a controlled device by infrared transmission technology. However, different types of remote controllers often utilize different coded formats for transmitting and receiving signals so as to operate complicated calculation within data transmission. Thus, the remote controller must have microprocessors capable of decoding and encoding formats installed inside. If we need utilizing the remote controller to control several sorts of the electronic devices, a complier corresponding to different coded formats needs to be stored additionally or else operation of the electronic devices will fail due to an incompatibility of the coded formats. Therefore, cost of manufacturing the remote controller and complication of process will be raised, and the compatibility of the remote controller will be limited.

SUMMARY OF THE INVENTION

According to the claimed invention, a method of controlling an electronic device, the method comprises connecting a portable wireless access device to an electronic device via a wireless broadband interface wirelessly, utilizing the electronic device to transmit an image datum corresponding to a user interface to the portable wireless access device via the wireless broadband interface, controlling a touch panel of the portable wireless access device to display the user interface according to the image datum, generating a location datum corresponding to a function item of the user interface according to a touched location on the touch panel, utilizing the portable wireless access device to transmit the location datum to the electronic device via the wireless broadband interface, and utilizing the electronic device to execute a function corresponding to the function item according to the location datum.

According to the claimed invention, a wireless access system comprising an electronic device comprising a user interface and a first wireless transceiver, and a portable wireless access device wirelessly connected to the electronic device via a wireless broadband interface, the portable wireless access device comprises a touch panel, a second wireless transceiver for receiving an image datum corresponding to the user interface transmitted from the first wireless transceiver and for transmitting a location datum to the first wireless transceiver, and a controller electrically connected to the touch panel and the second wireless transceiver for controlling the touch panel to display the user interface according to the image datum and for generating the location datum according to touched location while the touch panel is touched, the location datum being corresponding to a function item of the user interface, wherein the electronic device executes a function corresponding to the function item according to the location datum.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
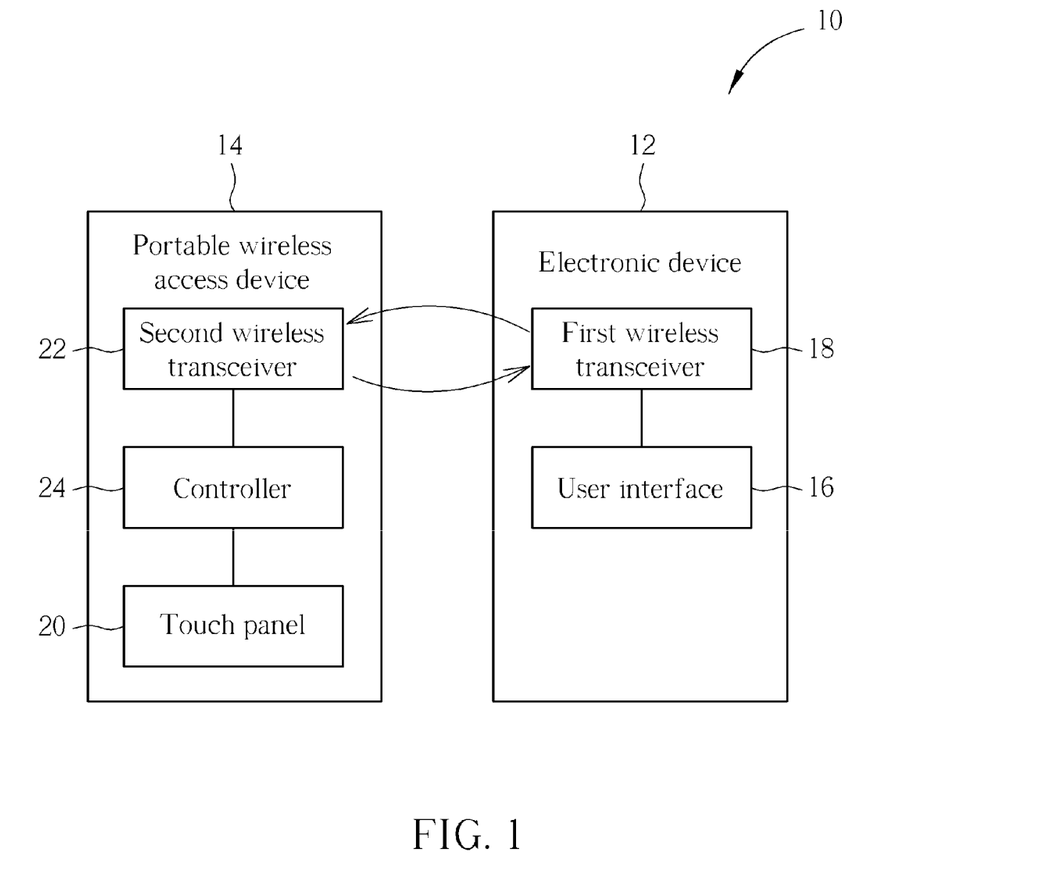
FIG. 1 is a functional block diagram of a wireless access system according a preferred embodiment of the present invention.

Please refer to FIG. 1. FIG. 1 is a functional block diagram of a wireless access system 10 according a preferred embodiment of the present invention. The wireless access system 10 includes an electronic device 12 and a portable wireless access device 14. The electronic device 12 includes a user interface 16 and a first wireless transceiver 18. The portable wireless access device 14 is wirelessly connected to the electronic device 12 via a wireless broadband interface. The wireless broadband interface can be an ultra wide band (UWB) wireless interface. The portable wireless access device 14 includes a touch panel 20, a second wireless transceiver 22, and a controller 24. The second wireless transceiver 22 is used for receiving an image datum corresponding to the user interface 16 transmitted from the first wireless transceiver 18 and for transmitting a location datum corresponding to a function item of the user interface 16 to the first wireless transceiver 18. The controller 24 is electrically connected to the touch panel 20 and the second wireless transceiver 22. The controller 24 is used for controlling the touch panel 20 to display an image corresponding to the user interface 16 according to the image datum and for generating the location datum according to touched location while the touch panel 20 is touched. The electronic device 12 is used for executing a function corresponding to the function item of the user interface 16 according to the location datum after the first wireless transceiver 18 receives the location datum.

In addition, the number of the electronic device 12 is not limited to one. That is to say, the portable wireless access device 14 can be wirelessly connected to a plurality of electronic devices via the wireless broadband interface so as to control a plurality of the electronic devices remotely.

Figure 2:
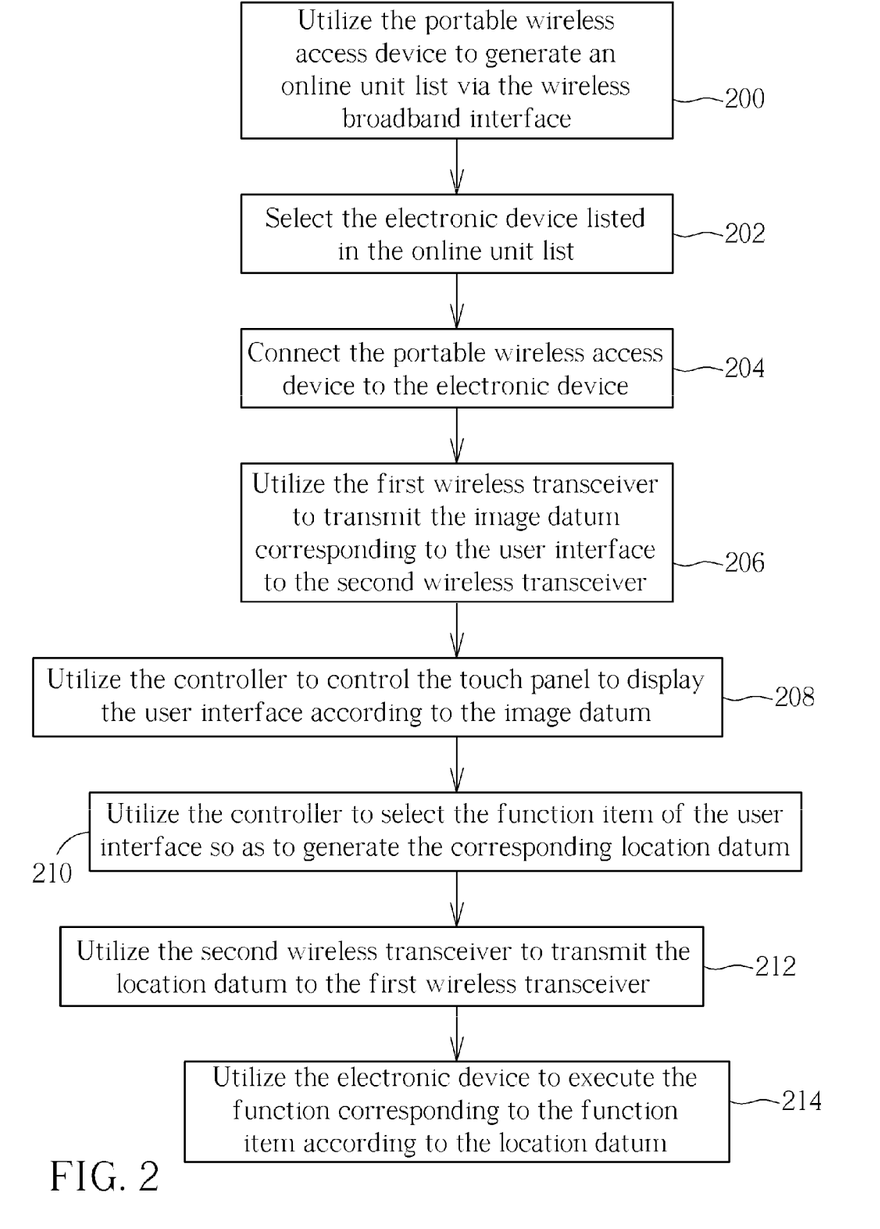
FIG. 2 is a flowchart of a remote control of an electronic device according the preferred embodiment of the present invention.

Please refer to FIG. 2. FIG. 2 is a flowchart of a remote control of the electronic device 12 according the preferred embodiment of the present invention. For simplicity, steps as shown in FIG. 2 merely describe access control between the portable wireless access device 14 and the electronic device 12. The access control between other electronic devices locating within an online range of the same wireless broadband interface and the portable wireless access device 14 can be analogized as steps shown in FIG. 2. The remote control of the electronic device 12 of the present invention includes following steps:

STEP 200: Utilize the portable wireless access device 14 to receive a package datum transmitted from the electronic device 12 locating within a predetermined range via the wireless broadband interface so as to generate an online unit list.

STEP 202: Select the electronic device 12 listed in the online unit list.

STEP 204: Connect the portable wireless access device 14 to the electronic device 12 via the wireless broadband interface wirelessly.

STEP 206: Utilize the first wireless transceiver 18 of the electronic device 12 to transmit the image datum corresponding to the user interface 16 to the second wireless transceiver 22 of the portable wireless access device 14 via the wireless broadband interface.

STEP 208: Utilize the controller 24 of the portable wireless access device 14 to control the touch panel 20 to display the user interface 16 according to the image datum.

STEP 210: Utilize the controller 24 to select the function item of the user interface 16 on the touch panel 20 so as to generate the corresponding location datum.

STEP 212: Utilize the second wireless transceiver 22 of the portable wireless device 14 to transmit the location datum to the first wireless transceiver 18 of the electronic device 12 via the wireless broadband interface.

STEP 214: Utilize the electronic device 12 to execute the function corresponding to the function item according to the location datum.

Figure 3:
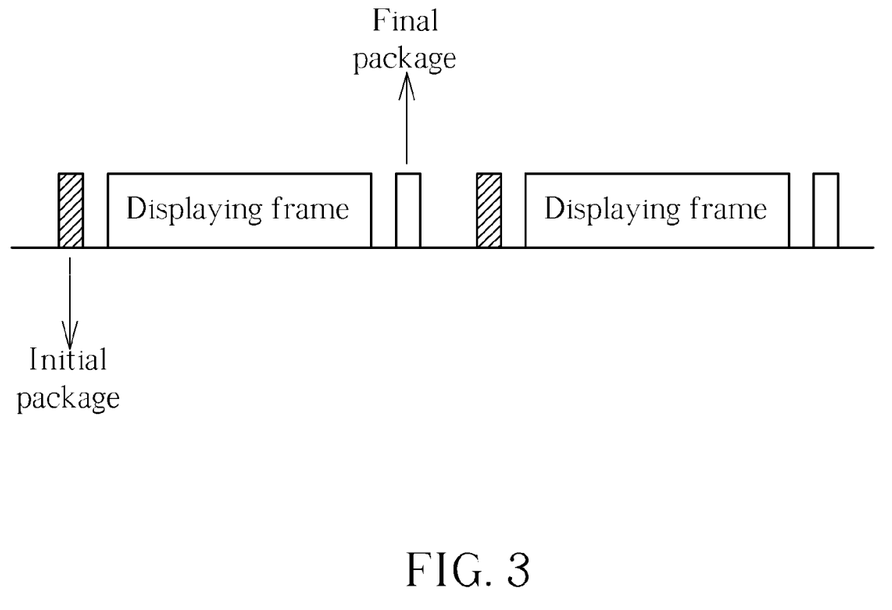
FIG. 3 is a diagram of a datum transmitted from the electronic device in FIG. 1 according the preferred embodiment of the present invention.
Figure 4:
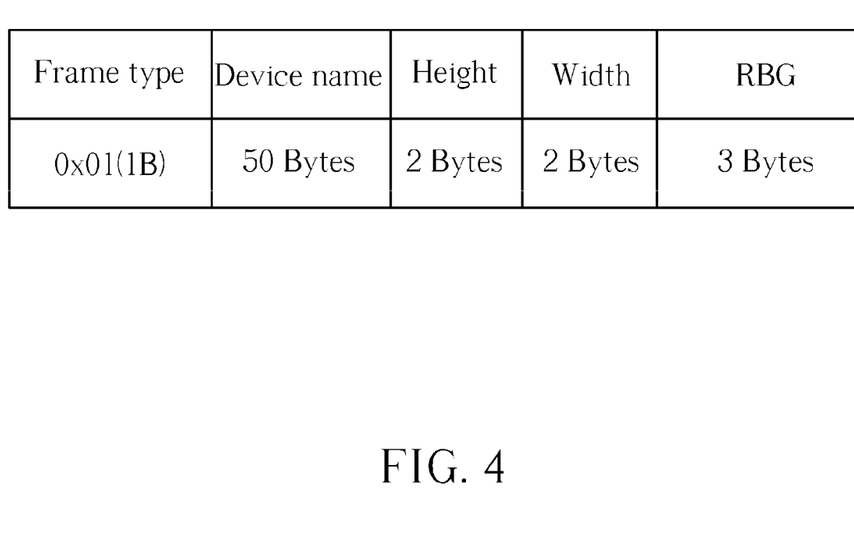
FIG. 4 is a diagram of an initial package in FIG. 3 according the preferred embodiment of the present invention.
Figure 5:
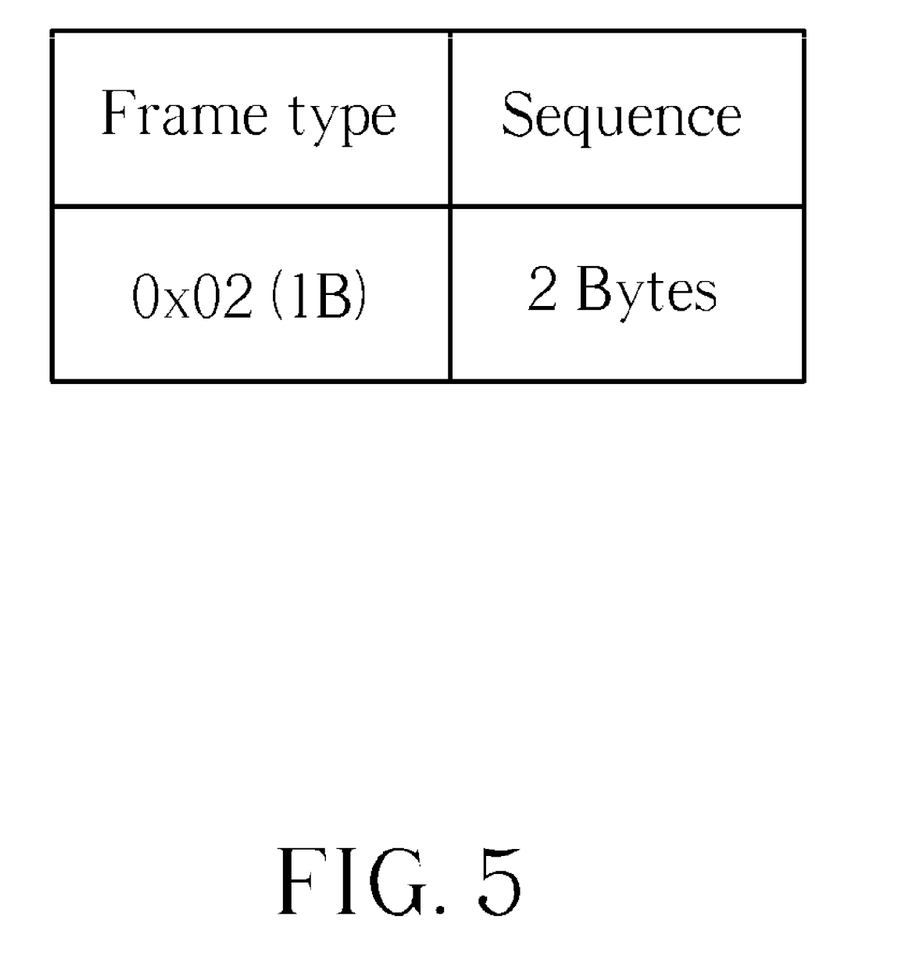
FIG. 5 is a diagram of a displaying frame in FIG. 3 according the preferred embodiment of the present invention.
Figure 6:
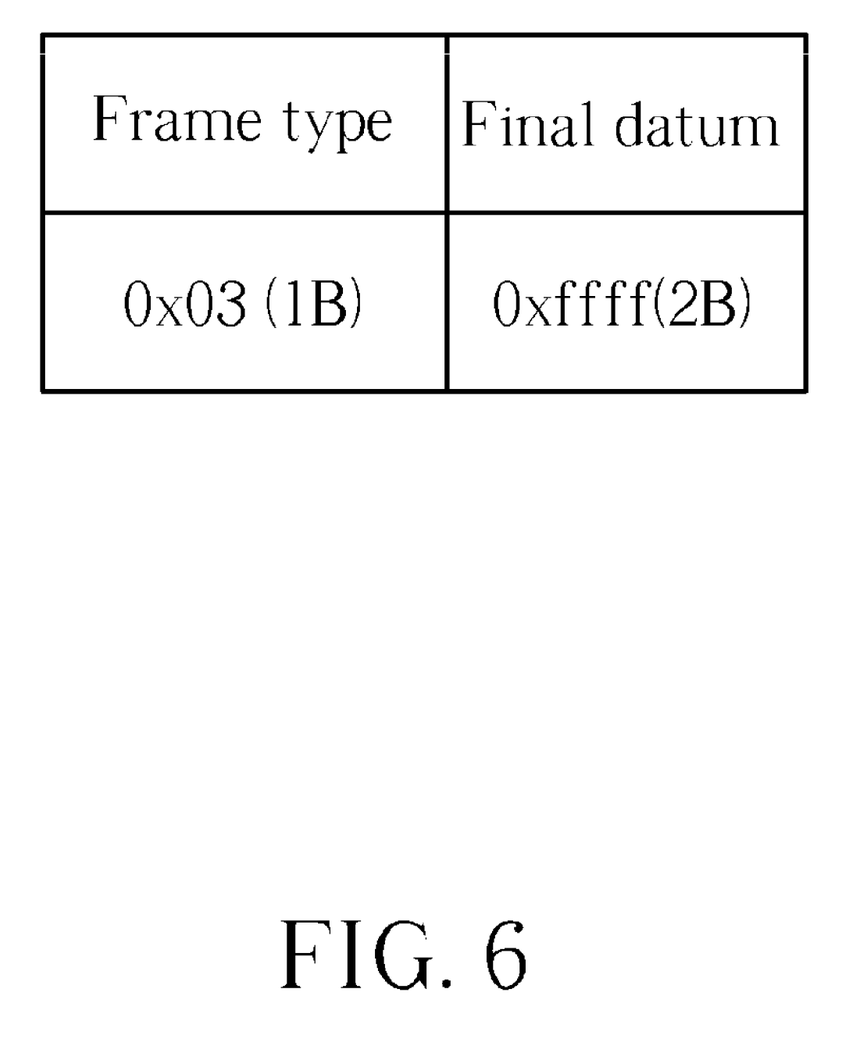
FIG. 6 is a diagram of a final package in FIG. 3 according the preferred embodiment of the present invention.

First, in STEP 200, locating within the predetermined range means that locating within the online range of the wireless broadband interface. While the portable wireless access device 14 has not connected to the electronic devices 12 yet, the electronic devices 12 locating within the online range of the wireless broadband interface broadcast their name data respectively, then the portable wireless access device 14 scans the electronic devices locating within the online range of the wireless broadband interface. It means that the second wireless transceiver 22 of the portable wireless access device 14 receives name data transmitted from the electronic devices locating within the online range of the wireless broadband interface so as to generate an online unit list. For example, please refer to FIG. 3. FIG. 3 is a diagram of a datum transmitted from the electronic device 12 in FIG. 1 according the preferred embodiment of the present invention. As shown in FIG. 3, the datum transmitted from the electronic device 12 is composed of an initial package, a displaying frame, and a final package. FIG. 4 is a diagram of an initial package in FIG. 3 according the preferred embodiment of the present invention. FIG. 5 is a diagram of a displaying frame in FIG. 3 according the preferred embodiment of the present invention. FIG. 6 is a diagram of a final package in FIG. 3 according the preferred embodiment of the present invention. As shown in FIG. 4, the datum carried by the initial package conforms to a name datum of the electronic device 12. It means that the first wireless transceiver 18 of the electronic device 12 transmits the name datum corresponding to the electronic device 12. After the second wireless transceiver 22 of the portable wireless access device 14 receives the name datum from the first wireless transceiver 18 of the electronic device 12, the controller 24 controls the touch panel 20 to display a name of the electronic device 12 according to the name datum. After selecting the electronic device 12 listed in the online unit list (in STEP 202), the portable wireless access device 14 is wirelessly connected to the electronic device 12 via the wireless broadband interface (in STEP 204).

As shown in FIG. 5, the displaying frame conforms to the image datum corresponding to the user interface 16. It means that the first wireless transceiver 18 of the electronic device 12 transmits the image datum corresponding to the user interface 16 to the second wireless transceiver 22 of the portable wireless access device 14 via the wireless broadband interface (in STEP 206). It should be mentioned that the wireless broadband interface can be an ultra wide band (UWB) wireless interface according to a preferred embodiment of the present invention. The UWB transmission interface is a radio communication technology used for data transmission with a very wide bandwidth and can provide the bandwidth (around 53.3 Mbps to 480 Mbps) for data transmission in a short distance (about 5 m to 20 m). Thus, in STEP 206, the electronic device 12 is capable of transmitting the image datum corresponding to the user interface 16 to the portable wireless access device 14 directly according to the physical layer protocol of the ultra wide band wireless interface, without encoding and decoding formats as mentioned in the prior art. That is to say, if the image datum is an image file of large capacity, the image datum must be processed by encoding and decoding the formats so that the image datum can be transmitted to the portable wireless access device 14 by turns in the wireless communication technology in the prior art. However, the ultra wide band wireless interface used in the embodiment of the present invention can provide the bandwidth around 53.3 Mbps to 480 Mbps. Even if the image datum is an image file having specifications of 800×600 pixel resolution and 30 frames per second, the electronic device 12 is still capable of transmitting the image datum to the portable wireless access device 14 according to the physical layer protocol of the ultra wide band wireless interface without encoding and decoding the formats. The physical layer, which is the lowest layer of open system interconnection, can be a transmission medium and a interconnect equipment between different electronic apparatuses for data transmission. It means that original data are transmitted in the physical layer via the transmission medium without encoding and decoding the formats. In the embodiment of the present invention, the transmission medium between the first wireless transceiver 18 of the electronic device 12 and the second wireless transceiver 22 of the portable wireless access device 14 uses the wireless broadband interface to replace a signal transmission cable.

Figure 7:
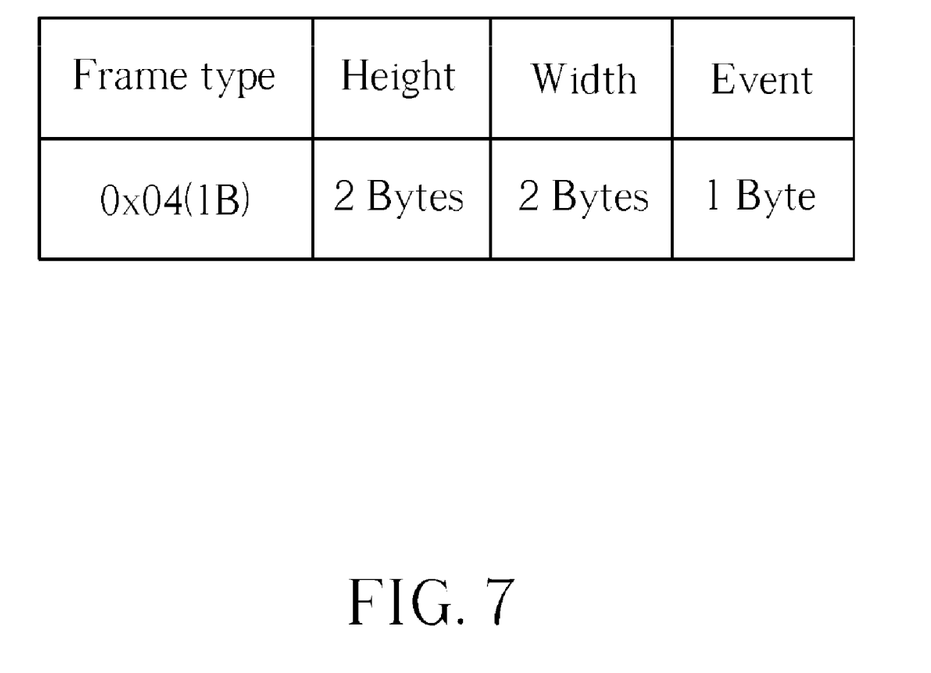
FIG. 7 is a diagram of a controlled package of a location datum in FIG. 2 according the preferred embodiment of the present invention.

After the second wireless transceiver 22 receives the image datum, the controller 24 of the portable wireless access device 14 controls the touch panel 20 to display the user interface 16 according to the image datum (in STEP 208). At the time, the user can select the function to be executed on the user interface 16 displayed on the touch panel 20. For example, if the electronic device 12 is an air conditioner, the user can view control functions corresponding to the air conditioner on the touch panel 20, such as temperature controller and wind adjustment etc. While the user touches the function item of the user interface 16 displayed on the touch panel 20, the controller 24 generates the corresponding location datum (in STEP 210). Please refer to FIG. 7. FIG. 7 is a diagram of a controlled package of the location datum in FIG. 2 according the preferred embodiment of the present invention. The location datum includes the controlled package as shown in FIG. 7, and the controlled package is corresponding to the function item to be executed. Then, the controller 24 controls the second wireless transceiver 22 to transmit the location datum to the first wireless transceiver 18 of the electronic device 12 via the wireless broadband interface (in STEP 212). Finally, the electronic device 12 executes the function corresponding to the function item according to the location datum (in STEP 214). That is to say, the electronic device 12 recognizes corresponding location coordinate values according to the location datum touched on the touch panel 20 of the portable wireless access device 14 and compares the location coordinate values touched on the touch panel 20 of the portable wireless access device 12 and function items listed on the user interface 16 so as to execute the function.

In contrast to the prior art, the portable wireless access device of the present invention is used for accessing and controlling the electronic devices with broadband transmission technology. By providing enough bandwidth for broadband transmission, the electronic devices can be used for transmitting the user interface corresponding to control functions thereof to the portable wireless access device directly, and then for executing corresponding functions according to location data transmitted from the portable wireless access device so as to operate remote control functions. Therefore, the data transmission between the portable wireless access device and the electronic device only includes receiving image data and transmitting the location data instead of encoding and decoding the formats for different electronic devices. The present invention not only economizes cost of the portable wireless access device and simplifies processes, but also has preferred device compatibility.

Those skilled in the art will readily observe that numerous modifications and alterations of the device and method may be made while retaining the teachings of the invention.

What is claimed is:

1. A method of controlling an electronic device, the method comprising:
    utilizing a portable wireless access device to receive name data transmitted from a plurality of electronic devices locating within a predetermined range via a wireless broadband interface so as to generate an online unit list on the portable wireless access device;
    utilizing the portable wireless access device to select one of the electronic devices listed in the online unit list;
    connecting the portable wireless access device to the selected electronic device via the wireless broadband interface wirelessly;
    utilizing the selected electronic device to transmit an image datum corresponding to a user interface to the portable wireless access device via the wireless broadband interface;
    controlling a touch panel of the portable wireless access device to display the user interface according to the image datum;
    generating a location datum corresponding to a function item of the user interface according to a touched location on the touch panel;
    utilizing the portable wireless access device to transmit the location datum to the selected electronic device via the wireless broadband interface; and
    utilizing the selected electronic device to execute a function corresponding to the function item according to the location datum.

2. The method of claim 1, wherein connecting the portable wireless access device to the selected electronic device via the wireless broadband interface wirelessly comprises connecting the portable wireless access device to the selected electronic device via an ultra wide band (UWB) wireless interface wirelessly.

3. The method of claim 1, wherein utilizing the selected electronic device to transmit the image datum corresponding to the user interface to the portable wireless access device via the wireless broadband interface comprises utilizing the selected electronic device to transmit the image datum corresponding to the user interface to the portable wireless access device according to a physical layer protocol of the wireless broadband interface.

4. A wireless access system comprising:
    a plurality of electronic devices, each of which comprises a user interface and a first wireless transceiver for transmitting a name datum thereof; and
    a portable wireless access device wirelessly connected to the electronic devices via a wireless broadband interface, the portable wireless access device comprising:
        a touch panel;
        a second wireless transceiver for receiving the name data transmitted from the electronic devices via the wireless broadband interface; and
        a controller electrically connected to the touch panel and the second wireless transceiver for controlling the touch panel to display an online unit list according to the name data;
    wherein when one of the electronic devices listed in the outline unit list is selected using the touch panel, an image datum corresponding to the user interface is transmitted from the first wireless transceiver of the selected electronic device to the second wireless transceiver of the portable wireless access device, the controller controls the touch panel to display the user interface according to the image datum, generates a location datum, which is corresponding to a function item of the user interface of the selected electronic device, according to touched location while the touch panel is touched, and controls the second wireless transceiver to transmit the location datum to the first wireless transceiver of the selected electronic device, and then the selected electronic device executes a function corresponding to the function item according to the location datum.

5. The wireless access system of claim 4, wherein the wireless broadband interface is an ultra wide band (UWB) wireless interface.

6. The wireless access system of claim 4, wherein data are transmitted between the first wireless transceiver and the second wireless transceiver according to a physical layer protocol of the wireless broadband interface.

* * * * *